United States Patent
Borrelli et al.

(10) Patent No.: US 10,209,419 B2
(45) Date of Patent: Feb. 19, 2019

(54) BROADBAND POLARIZER MADE USING ION EXCHANGEABLE FUSION DRAWN GLASS SHEETS

(71) Applicant: Corning Incorporated, Corning, NY (US)

(72) Inventors: Nicholas Francis Borrelli, Elmira, NY (US); Nakia Leigh Heffner, Corning, NY (US); Joseph Michael Matusick, Corning, NY (US); Joseph Francis Schroeder, III, Corning, NY (US); Thomas Philip Seward, III, Elmira, NY (US); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 906 days.

(21) Appl. No.: 14/483,306

(22) Filed: Sep. 11, 2014

(65) Prior Publication Data
US 2015/0212247 A1 Jul. 30, 2015

Related U.S. Application Data

(60) Provisional application No. 61/878,720, filed on Sep. 17, 2013.

(51) Int. Cl.
*G02B 5/30* (2006.01)
*C03C 4/10* (2006.01)
(Continued)

(52) U.S. Cl.
CPC .......... *G02B 5/3058* (2013.01); *C03B 23/037* (2013.01); *C03C 3/087* (2013.01); *C03C 3/091* (2013.01); *C03C 4/10* (2013.01); *C03C 4/18* (2013.01); *C03C 14/006* (2013.01); *C03C 21/002* (2013.01); *C03C 21/005* (2013.01); *C03C 23/007* (2013.01);
(Continued)

(58) Field of Classification Search
CPC C03C 3/087; C03C 3/091; C03C 4/18; C03C 21/002; C03C 21/005; C03C 23/007; C03B 23/037; G02B 5/3058
USPC ............ 359/487.06; 252/585; 65/17.3, 30.13
See application file for complete search history.

(56) References Cited

U.S. PATENT DOCUMENTS

| 815,843 A | 5/1906 | Lightbody et al. |
| 3,338,696 A | 8/1967 | Dockerty et al. |

(Continued)

FOREIGN PATENT DOCUMENTS

| DE | 10227379 | 12/2003 |
| DE | 20227393 | 12/2003 |

(Continued)

OTHER PUBLICATIONS

PCT/US2014/055802—Search Report.
(Continued)

*Primary Examiner* — Ricky D Shafer
(74) *Attorney, Agent, or Firm* — Robert L. Carlson (57) ABSTRACT

The disclosure is directed to broadband, glass optical polarizers and to methods for making the glass optical polarizers. The glass optical polarizer includes a substantially bubble free fusion drawn glass having two pristine glass surfaces and a plurality of elongated zero valent metallic particle polarizing layers.

10 Claims, 5 Drawing Sheets

(51) Int. Cl.
*C03C 3/087* (2006.01)
*C03C 3/091* (2006.01)
*C03C 14/00* (2006.01)
*C03C 21/00* (2006.01)
*C03C 23/00* (2006.01)
*C03B 23/037* (2006.01)
*C03C 4/18* (2006.01)

(52) U.S. Cl.
CPC ........ *G02B 5/3041* (2013.01); *C03C 2204/00* (2013.01); *C03C 2214/08* (2013.01); *C03C 2214/16* (2013.01)

(56) References Cited

U.S. PATENT DOCUMENTS

| | | | |
|---|---|---|---|
| 3,682,609 A | | 8/1972 | Dockerty et al. |
| 4,479,819 A | | 10/1984 | Borelli et al. |
| 5,999,315 A | * | 12/1999 | Fukano .................. C03C 17/34 204/192.26 |
| 6,563,639 B1 | * | 5/2003 | Borrelli ..................... C03C 4/00 359/484.03 |
| 6,753,279 B2 | | 6/2004 | Kohli |
| 6,761,045 B2 | | 7/2004 | Hasui et al. |
| 6,887,808 B2 | | 5/2005 | Hasui et al. |
| 6,974,786 B2 | | 12/2005 | Helfinstine et al. |
| 7,256,937 B2 | | 8/2007 | Volke et al. |
| 8,063,999 B2 | | 11/2011 | Jabri et al. |
| 8,158,543 B2 | | 4/2012 | Dejneka et al. |
| 8,312,739 B2 | | 11/2012 | Lee et al. |
| 8,431,301 B2 | | 4/2013 | Ninomiya et al. |
| 8,778,820 B2 | | 7/2014 | Gomez et al. |
| 2003/0136152 A1 | | 7/2003 | Borrelli et al. |
| 2007/0093373 A1 | * | 4/2007 | Borrelli ................ C03B 23/047 501/2 |
| 2007/0139770 A1 | * | 6/2007 | Morimoto ............... C03C 14/00 359/487.06 |
| 2007/0141350 A1 | | 6/2007 | Borelli et al. |
| 2008/0047300 A1 | | 2/2008 | Rhoads et al. |
| 2009/0142568 A1 | | 6/2009 | Dejneka et al. |
| 2009/0217705 A1 | | 9/2009 | Filippov et al. |
| 2011/0045962 A1 | | 2/2011 | Veye et al. |
| 2011/0201490 A1 | | 8/2011 | Barefoot et al. |
| 2012/0111055 A1 | | 5/2012 | Allan et al. |
| 2012/0216570 A1 | | 8/2012 | Abramov et al. |
| 2012/0237674 A1 | | 9/2012 | Kumai |
| 2013/0122284 A1 | | 5/2013 | Gross et al. |
| 2013/0122313 A1 | | 5/2013 | Gross et al. |
| 2014/0139910 A1 | * | 5/2014 | Gafsi ...................... G02B 1/11 359/352 |

FOREIGN PATENT DOCUMENTS

| | | |
|---|---|---|
| DE | 20110607 | 1/2004 |
| DE | 20220607 | 1/2004 |
| JP | 07097235 A | 4/1995 |
| WO | 199959006 A1 | 11/1999 |
| WO | 2007/050443 | 5/2007 |
| WO | 2010141832 | 12/2010 |
| WO | 2013063207 A1 | 5/2013 |

OTHER PUBLICATIONS

N.F.Borrelli, et al., "Polarcor™ Polarizing Glasses", "New Glass", vol. 27, No. 1, (Mar. 2012), Serial No. 104, pp. 27-35.

Adam Ellison et al. "Glass Substrates for liquid Crystal Displays", International Journal of Applied Glass Science, 1[1], pp. 87-103 (2010).

Peter Bocko et. al. "The Challenges of Higher-Generation Glass", Display Glass, Information Display, Nov. 2003, pp. 12-15, 2003.

Thomas P. Seward. III, "Elongation and Spheroidization of Phase-Separated Particles in Glass", Journal of Non.Crystalline Solids, 15 (1974), pp. 487-504.

English Translation of JP2016542867 Office Action dated Jul. 3, 2018; 5 Pages; Japanese Patent Office.

English Translation of CN201480050851.5 First Office Action dated Sep. 29, 2017, China Patent Office.

* cited by examiner

PRIOR ART

BROADBAND POLARIZER MADE USING ION EXCHANGEABLE FUSION DRAWN GLASS SHEETS

This application claims the benefit of priority of U.S. Application Ser. No. 61/878,720 filed on Sep. 17, 2013 the content of which is relied upon and incorporated herein by reference in its entirety.

FIELD

This disclosure is directed to glass polarizers made from ion-exchangeable fusion drawn sheet glass, and a method of making such polarizers using ion-exchangeable fusion drawn glass sheets. The polarizers described herein are broadband glass polarizers operative in the infrared region of the electromagnetic spectrum.

BACKGROUND

Glass optical polarizers are made by a number of different corporations using different methods. Among these glass optical polarizers are the Polarcor™ (Corning Incorporated, Corning, N.Y.) glass polarizing products which are formed by heat treating a glass containing silver and halide ions to precipitate silver halide particles, which particles are then stretched in a redraw step which is followed by a reduction step in which the silver halide particles are reduced to form anisotropic silver particles in the glass. Other polarizers are made from sodium silicate (soda lime) glass by ion exchanging silver ions for sodium ions near the glass surface, followed by heat treating and drawing the soda lime glass to elongate silver particles in the glass.

While the presently available polarizers have served industry well, with increasing miniaturization, particularly in the telecommunications industry, there is a need for glass optical polarizers that are both thin and strong. The present disclosure is directed to such polarizer products and to a method for making the same.

SUMMARY

According to an embodiment of the present disclosure, a glass optical polarizer is provided. The glass optical polarizer includes a substantially bubble free fusion drawn glass having two pristine glass surfaces and a plurality of elongated zero valent metallic particle polarizing layers.

According to another embodiment of the present disclosure, a method for making a glass optical polarizer is provided. The method includes providing a fusion drawn alkali-containing glass substrate and ion-exchanging a noble metal ion into the glass substrate using an ion-exchange molten metal salt bath. The molten metal salt bath includes a noble metal salt and an alkali metal salt. The method further includes removing excess ion-exchange salts from the glass substrate, and reducing the noble metal ion in hydrogen to form a plurality of zero valent metallic particle polarizing layers. The method further includes redrawing the glass substrate to form a plurality of elongated zero valent metallic particle polarizing layers. The glass optical polarizer has two pristine glass surfaces and is substantially bubble free.

DETAILED DESCRIPTION

Herein, contrast of a polarizer is the ratio $T_{max}/T_{min}$ and the contrast ratio is the $\log_{10}(T_{max}/T_{min})$, where $T_{max}$ is the maximum transmission value and and $T_{min}$ is the minimum transmission value.

This disclosure is directed to glass optical polarizers made from fusion drawn glass, and to a method for making the polarizers using ion-exchange. This disclosure describes a process by which metal ions are ion-exchanged into a fusion drawn glass sheet, and then the ion-exchanged glass sheet is further processed to make glass optical polarizers. Metal ions such as, but not limited to, noble metal ions can be ion-exchanged into the glass to create optical polarizers. For the purposes of the present disclosure, noble metals include, but are not limited to, copper, gold, iridium, mercury, osmium, palladium, platinum, rhenium, rhodium, ruthenium, and silver.

The polarizers disclosed herein may have a thickness of about 100 μm to about 350 μm and a contrast ratio of at least about 20 dB over a wavelength range of about 900 nm to about 2,000 nm. The polarizers may have a thickness of about 200 μm to about 300 μm. Alternatively, the polarizers may have a contrast ratio of at least about 30 dB over a wavelength range of about 1,000 nm to about 2,000 nm. The polarizers can be made of any fusion drawn glass containing ion-exchangeable alkali metal ions, for example but without limitation, an alkali-containing aluminosilicate glass, alkali-containing aluminoborosilicate glass and soda lime glass. The glass may be fusion drawn glass containing exchangeable alkali metal ions. Exemplary glass compositions can be found in U.S. Pat. Nos. 8,431,301 and 8,158,543, and in U.S. Patent Application Publication Nos. 2011/0045962, 2011/0201490, 2013/0122284 and 2013/0122313, the specifications of which are incorporated by reference in their entirety.

The polarizers disclosed herein may include a plurality of elongated zero valent metallic particle polarizing layers having a thickness of about 0.2 μm to about 0.5 μm. The metallic particle polarizing layers may be situated within about 1.0 μm to about 2.0 μm of at least one of the pristine surfaces of the fusion drawn glass. Some of the metallic particle polarizing layers may be situated within about 1.0 μm to about 2.0 μm of a first of the two pristine surfaces, and some of the metallic particle polarizing layers may be situated within about 1.0 μm to about 2.0 μm of a second of the pristine surfaces. The metallic particles correspond to the metal ions which are ion-exchanged into the glass.

The ion-exchanged, optical polarizers disclosed herein may find utility in the infrared (IR) region and can be used in, among other things, telecommunications and supporting equipment. The polarizers described herein may be thin, broadband final products that have a good quality surface finish. Due to the fact they are made from fusion drawn glass, the polarizers do not require additional finishing steps. The use of fusion drawn glass imparts characteristics to the surface of the finished glass, as well as to the internal glass network structure, that cannot be obtained using other types of glass, for example, slot drawn glass, float glass and cast glass.

A method for making a glass optical polarizer is provided herein. The method described herein does not affect the pristine nature of the fusion drawn glass surfaces and does not introduce scratches, sub-surface defects, or bubbles into the formed glass. The method may include providing a fusion drawn alkali-containing glass sheet as a substrate. The sheet may have a thickness of about 0.5 mm to about 2.0 mm. The composition of the provided glass sheet may be, but is not limited to, alkali-containing aluminosilicate and alkali-containing aluminoborosilicate glasses.

The method may further include ion-exchanging a noble metal ion into the fusion glass substrate using an ion-exchange molten metal salt bath. The molten metal salt bath may include a noble metal salt. The molten metal salt bath may optionally include an alkali metal salt in which the noble metal salt may be dissolved. At least one of the noble metal salt and the alkali metal salt may be, for example, a nitrate salt. As a further example, the noble metal salt may be a silver nitrate salt and the alkali metal salt may be a potassium nitrate salt.

Examples of ion-exchange methods are described in U.S. Pat. No. 8,312,739, and U.S. Patent Application Publication Nos. U.S. 2008/00407300 and U.S. 2009/0142568, the specifications of which are incorporated by reference in their entirety.

Ion-exchanging a noble metal ion into the fusion glass substrate may be done, for example, for a period of about 1.0 hour to about 20 hours and at a temperature of about 300° C. to about 500° C. The time period and the temperature during ion-exchange may be varied in order to modify the depth to which the noble metal ion diffuses into the fusion glass substrate.

The method may further include removing excess ion-exchange salts from the ion-exchanged substrate to thereby yield a fusion glass substrate having a noble metal ion therein.

The method may further include reducing the noble metal ion in pure hydrogen to form a fusion drawn glass substrate having a plurality of zero valent metallic particle polarizing layers. Reducing the noble metal ion may be done at a pressure of about 1.0 atm to about 20 atm. The pressure may be varied as desired, as higher pressures may be used to affect the rate of reduction. Reducing the noble metal ion may be done at a temperature of about 350° C. to about 550° C. Further, reducing the noble metal ion may be done for a time of about 1.0 hour to about 30 hours.

The method may further include redrawing the fusion drawn glass substrate having a plurality of zero valent metallic particle polarizing layers. Redrawing the fusion glass substrate may be done by heating and stretching the substrate at a viscosity of $10^5$-$10^{10}$ poise (e.g., $10^6$-$10^7$ poise or $10^7$-$10^9$ poise). Redrawing the fusion glass substrate may be done, for example, at a temperature above the annealing point $T_{anneal}$ (i.e., a glass viscosity less than $10^{-13}$ poise), but at least about 50° C. below the softening point $T_{soft}$ of the glass (i.e., glass viscosity above $10^{-7.5}$ poise). The annealing point $T_{anneal}$ may be about 550° C. to about 650° C. (for example 590° C.<$T_{anneal}$<610° C.); and the softening point $T_{soft}$ may be about 800° C. to about 900° C. (for example 860° C.<$T_{soft}$<870° C.).

Redrawing the fusion drawn glass substrate may reduce the scale (primarily the thickness) of the substrate to form a glass optical polarizer having a thickness of about 300 μm or less. Redrawing the fusion drawn glass substrate may also yield a stretched microstructure of the noble metal particles embedded in the substrate, which in turn yields polarizing properties suitable for glass optical polarizers. The resultant glass optical polarizer may have two pristine glass surfaces and may be substantially bubble free.

Examples of a redraw process are shown in U.S. Pat. Nos. 7,510,989 and 7,618,908, the specifications of which are incorporated by reference in their entirety.

After redrawing the fusion drawn glass substrate, the resulting polarizers may have a thickness of about 400 μm or less. Alternatively, the thickness may be about 300 μm or less. The polarizers described herein have a transmission of at least about 80% over a wavelength range of about 1,000 nm to about 2,100 nm. The polarizers may have an average redrawn thickness of about 300 μm or less with a good quality surface finish that does not require additional finishing steps due to the fact that the polarizers are formed from fusion drawn glass.

Subsequent to redrawing the fusion drawn glass substrate, the method disclosed herein may further include chemically strengthening the glass optical polarizer. Chemically strengthening may include ion-exchanging a larger alkali metal ion for a smaller alkali metal ion in the fusion glass substrate using an ion-exchange molten metal salt bath. The alkali metal ion may be, for example, a potassium ion, and the smaller alkali metal ion may be, for example, a sodium ion. The molten metal salt bath may include an alkali metal salt. The alkali metal salt may be, for example, a nitrate salt. As a further example, the alkali metal salt may be a potassium nitrate salt. Chemically strengthening may restore any compressive strength that is lost during hydrogen reduction or during the redrawing of the fusion drawn glass substrate and provide a strong, damage resistant glass optical polarizer.

As previously mentioned, fusion drawn glass has two pristine glass surfaces and the method used to make the polarizers described herein does not substantially affect the pristine surfaces. The fusion draw process has been described in U.S. Pat. Nos. 3,338,696, 3,682,609, and 6,974,786, and in U.S. Patent Application Publication No. 2008/0047300, the specifications of which are incorporated by reference in their entirety, and has been employed in the production of active-matrix liquid-crystal-displays (AM-LCD). Although display applications dictate the use of alkali-free glass, optical polarizers are not limited to alkali-free glass.

The fusion draw process imparts characteristics to fusion drawn glass not observed in other glass. For example, the process provides precise geometry control which enables uniform glass thickness. The process also eliminates bubbles (also called seeds, voids or inclusions) within the glass. Bubbles can affect light transmission through glass by changing the angle of the light's path as is passes from glass to void and back into glass. This causes birefringence in the glass which affects light transmission by introducing scattering and detrimentally affects optical polarizers, particularly when used in telecommunications equipment. The pristine surfaces of the fusion drawn glass are substantially flat, smooth, and substantially free of any surface contamination in the as-formed state. Furthermore, fusion drawn glass does not contain surface roughness or sub-surface flaws such as arise in any grinding and/or polishing procedure. Unlike other glass processes the fusion draw process buries the forming surfaces of the glass that contact the forming surface of an element, called an isopipe, within the formed sheet of glass. Thus the exterior surfaces of the glass are contact free and pristine.

The use of thin (about 0.5 mm to about 2.0 mm) fusion drawn glass as the starting glass material provides optical polarizers having high quality pristine surfaces (without the need for extensive post processing such as grinding and polishing) and having final thicknesses of about 300 μm or less, a contrast ratio of at least about 20 dB and a transmission of at least about 75% over a wavelength range of about 900 nm to about 2,000 nm. Optical polarizers as described herein may also have a transmission of greater than about 82% over a wavelength range of about 1,000 nm to about 2,000 nm. Within the telecommunications range of about 1,300 nm to about 1,550 nm, the transmission may be greater than about 85%. The contrast ratio may be equal to or greater than about 25 dB over a wavelength range of about 900 nm to about 2,000 nm. Alternatively, the contrast ratio may be greater than about 30 dB over a wavelength range of about 900 nm to about 2,000 nm.

Properties, for example, contrast ratio, of the polarizers described herein, are less sensitive to pulling tensions such as those applied during the redraw process in which glass viscosity is $10^5$-$10^{10}$ poise (for example $10^5$-$10^7$, or $10^7$-$10^9$). The viscosity may vary based on the composition of the glass stretched.

EXAMPLES

Embodiments of the present disclosure are further described below with respect to certain exemplary and specific embodiments thereof, which are illustrative only and not intended to be limiting.

In the examples described herein, silver ions were used as the exemplary noble metal ion-exchanged into the fusion drawn glass. However, other noble metal ions can also be ion-exchanged into the fusion drawn glass. In addition, while an alkali-containing aluminoborosilicate glass was used in the examples, other glasses, such as, but not limited to, alkali-containing aluminosilicate glass, can also be used. Exemplary alkali-containing aluminoborosilicate and aluminosilicate glasses may include, but are not limited to, those shown in Table I. Further, while the ion-exchange of noble metal ions and alkali metal ions into the glass is exemplified herein using a molten salt bath method, the ions can also be exchanged into the glass using a paste that is applied to the surface of the glass and then heated.

Table I lists a number of exemplary glass compositions that can be used to make fusion drawn glass for use in an optical polarizer as described herein. The general glass composition, before any ion-exchange, comprises about 60 mol % to about 70 mol % $SiO_2$, about 13 mol % to about 15 mol % $Na_2O$, about 7.0 mol % to about 15 mol % $Al_2O_3$, less than about 8.0 mol % $B_2O_3$, less than about 8.0 mol % MgO, less than about 2.0 mol % $K_2O$, less than about 1.0 mol % CaO and less than about 0.5 mol % $SnO_2$.

TABLE I

Exemplary Compositions (in mol %) Used in the Examples

|  | Glass 1 | Glass 2 | Glass 3 | Glass 4 |
|---|---|---|---|---|
| $SiO_2$ | 64.44 | 64.65 | 66.00 | 69.17 |
| $Al_2O_3$ | 13.9 | 13.93 | 10.26 | 8.53 |
| $B_2O_3$ | 7.15 | 5.11 | 0.58 | 0 |
| $Na_2O$ | 14.03 | 13.75 | 14.23 | 13.94 |
| $K_2O$ | 0.54 | 0 | 2.37 | 1.17 |
| MgO | 0.01 | 2.38 | 5.75 | 6.45 |
| CaO | 0.06 | 0.14 | 0.59 | 0.54 |
| $SnO_2$ | 0.12 | 0.08 | 0.21 | 0.19 |

Figure 1:
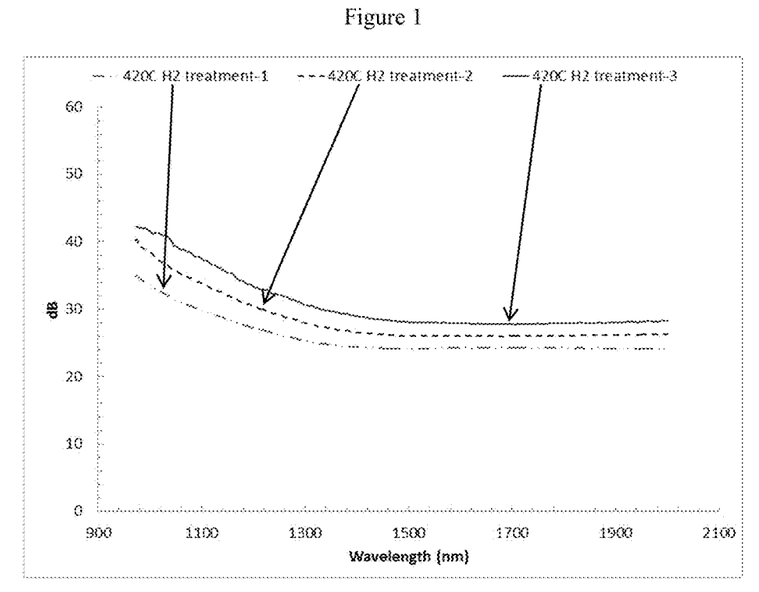
FIG. 1 is a graph illustrating contrast ratio (in dB) versus wavelength of redrawn glass polarizers prepared as described herein.
Figure 2:
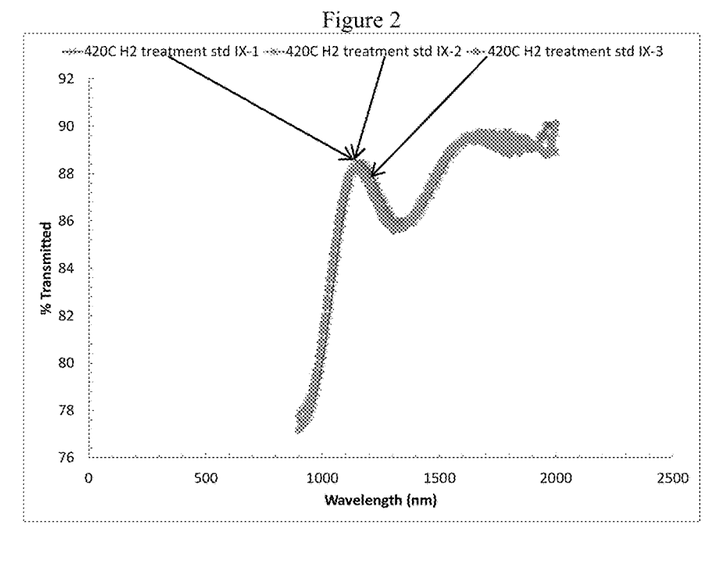
FIG. 2 is a graph illustrating % transmission versus wavelength of redrawn glass polarizers prepared as described herein.

The fusion drawn glass sheets used in the example were obtained using a fusion draw process and were then ion-exchanged for a period of about 20 hours at a temperature of about 420° C. in an ion-exchange bath containing about 2.0 wt. % $AgNO_3$ and about 98 wt. % $KNO_3$. After completion of the ion-exchange, the silver ions were reduced in about 1.0 atm of pure hydrogen at a temperature of about 400° C. for about 10 hours in a hydrogen furnace. The silver-containing glass sheets were then stretched using a redraw process at various temperatures T ranging from about 750° C. to about 900° C. to yield various strips with differing amounts of stretching force applied to them. The contrast ratio and % transmission measurement data for the resulting glass polarizers are shown in FIGS. 1 and 2, respectively.

Figure 3:
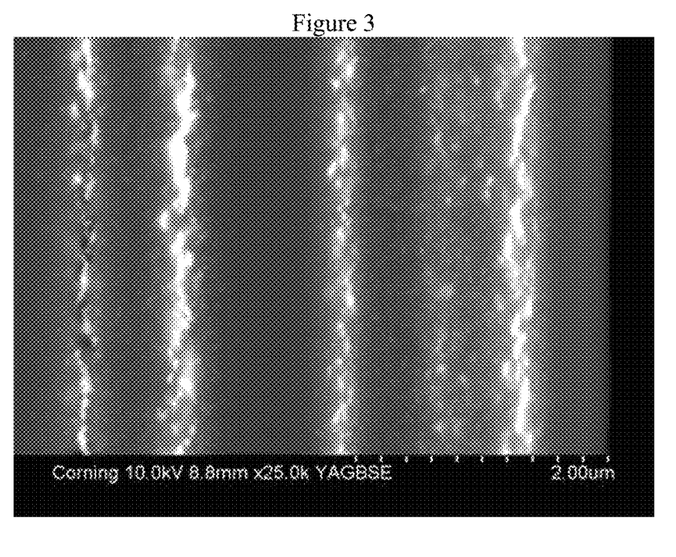
FIG. 3 is an SEM (scanning electron microscopy) photograph of the cross section of polarizing glass prepared as described herein after the hydrogen reduction.
Figure 4A:
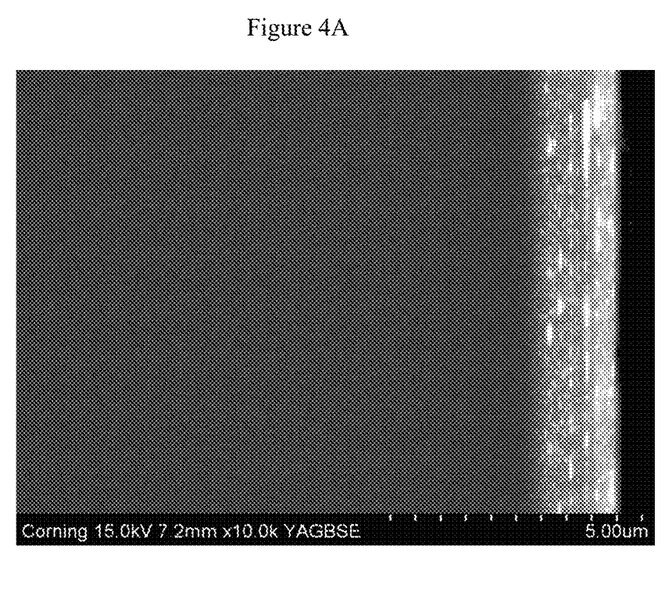
FIG. 4A is an SEM photograph of polarizing glass prepared as described herein after hydrogen reduction at 420° C. for 20 hours and stretching at a tension of 6000 psi.
Figure 4B:
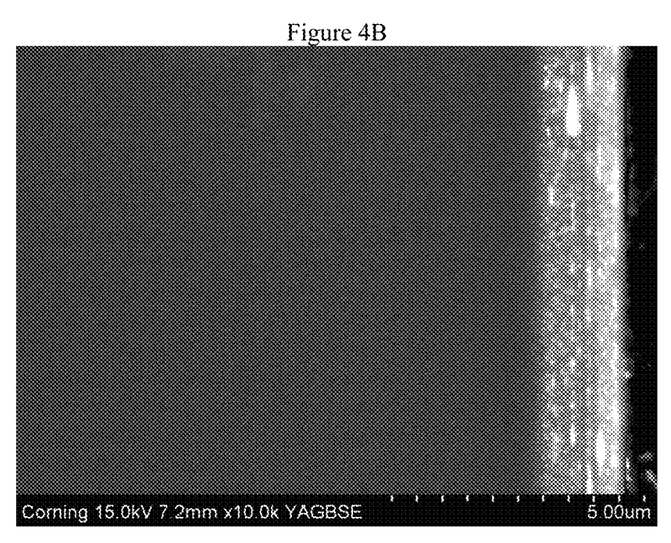
FIG. 4B is an SEM photograph of polarizing glass prepared as described herein after hydrogen reduction at 420° C. for 20 hours and stretching at a tension of 2000 psi.
Figure 4C:
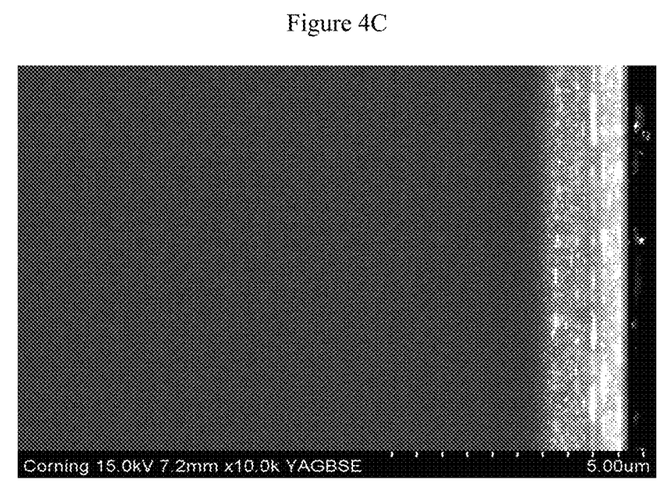
FIG. 4C is an SEM photograph of polarizing glass prepared as described herein after hydrogen reduction at 420° C. for 20 hours and stretching at a tension of 4000 psi.
Figure 7:
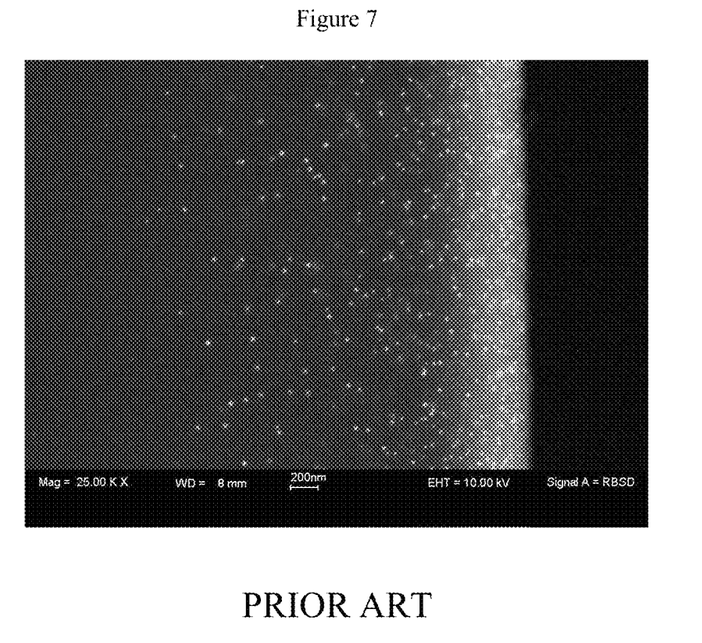
FIG. 7 depicts a prior art polarizer.

FIG. 3 is an SEM photograph of a hydrogen reduced silver-containing fusion drawn glass prepared according to the present disclosure. FIG. 3 illustrates four bands or layers comprising zero valent metallic particle layers. More specifically, FIG. 3 shows broken segments of silver-containing sheets of various sizes and shapes which appear as bright lines or broken line segments. When the glass of FIG. 3 is redrawn, the zero valent metallic particles become elongated, thereby polarizing the bands or layers. FIGS. 4A-4C show a variety of sizes and aspect ratios that lead to the broadband properties of the polarizer disclosed herein. FIGS. 4A-4C exemplify the glass polarizers produced according to this disclosure. In contrast to what is illustrated in FIGS. 4A-4C, the prior art polarizers, as shown in FIG. 7, do not show the broad range of particle size and shape.

The scientific literature indicates that the wavelength of maximum absorption for an elongated noble metal nano-particle depends on its aspect ratio. As used herein, the aspect ratio is the ratio of length:diameter. As such, a distribution of aspect ratios of respective nano-particles may provide high contrast and good transmission over a wide wavelength range. Further, as shown in FIG. 3, a distribution of silver metal particle sizes in the hydrogen treated glass leads to a corresponding distribution in aspect ratios. It is believed that during the redraw process, the softened glass acts as a flowing fluid exerting elongation forces on the noble metal particle. Nano-sized particles can be elongated in such a fluid flow field if the forces exerted by the flowing fluid are sufficient to overcome the restoring forces of surface tension, which tend to maintain the particle's spherical shape. These restoring forces are proportional to the surface tension and inversely proportional to the particle radius. Hence, the larger the particle, the less the restoring force and the more easily the particle can be elongated. As such, for a given stress during the redraw process, larger particles will be elongated to higher aspect ratios. This is verified by FIGS. 4A-4C, which show the microstructure of glass polarizers after the redraw process at three different pull tensions.

Figure 6A:
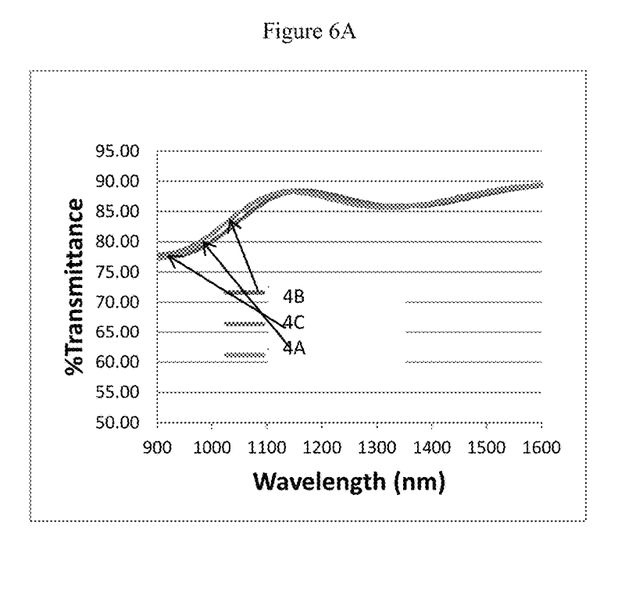
FIG. 6A is the maximum transmission for the glass polarizer of FIGS. 4A, 4B and 4C.
Figure 6B:
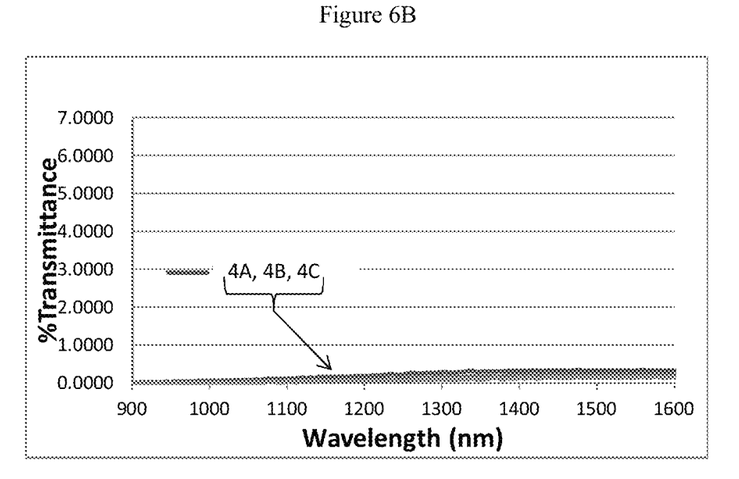
FIG. 6B is the minimum transmission for the glass polarizer of FIGS. 4A, 4B and 4C.

FIG. 6A illustrates the maximum transmission for the glass polarizer of FIGS. 4A, 4B and 4C. FIG. 6B illustrates the minimum transmission for the glass polarizer of FIGS. 4A, 4B and 4C. As FIGS. 6A and 6B exhibit by their maximum and minimum transmissions, the three polarizers of FIGS. 4A-C are deemed substantially equivalent.

It is believed that the production of the microstructure exhibited in FIG. 3 is the result of instability in a typical reaction-diffusion system, also known as Liesegang effect. The bands of silver particles and line segments shown in FIG. 3 are also referred to as "Liesegang bands". Without being held to any particular theory, it is believed that the explanation for this behavior or effect is that the fusion drawn glass compositions undergo a reaction-diffusion based instability during hydrogen reduction leading to the production of layers of silver particles that have a wide distribution of both size and aspect ratio. The appearance of the Liesegang layers is believed to be dependent on parameters such as, but not limited to, the glass composition, the silver concentration in the glass, the hydrogen partial pressure, the time and temperature of the ion exchange process, and the time and temperature of the hydrogen reduction process.

Figure 5:
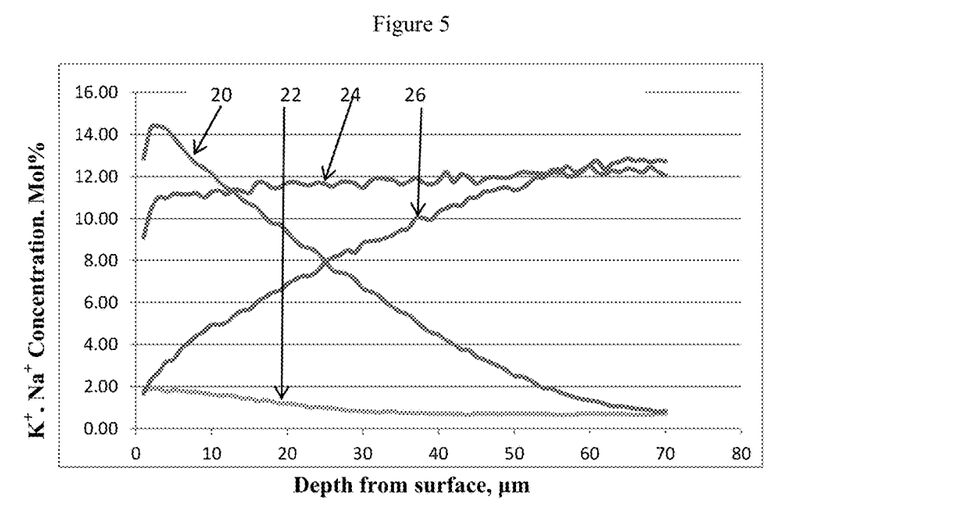
FIG. 5 is a graph illustrating sodium and potassium ion concentration for two different glass samples.

FIG. 5 is the ion profile, potassium or sodium ion concentration in mol %, determined as the oxide, versus depth from the glass surface. Potassium oxide (curve 22) and sodium oxide (curve 24) concentrations were measured in fusion drawn glass sheets which had undergone hydrogen reduction and the redraw process. For comparison, potassium oxide (curve 20) and sodium oxide (curve 26) concentrations in fusion drawn glass sheets which had undergone hydrogen reduction, had been redrawn and were subsequently treated in an ion-exchange molten metal salt bath which included a potassium nitrate salt. Table III summarizes the curves shown in FIG. 5.

TABLE III

Numeral meaning for FIG. 5

| Numeral, Species | K Ion-exchange after redraw |
|---|---|
| 20, $K_2O$ | Yes |
| 22, $K_2O$ | No |
| 24, $Na_2O$ | No |
| 26, $Na_2O$ | Yes |

The exchange of potassium ions for sodium ions is known to increase glass strength; however, it was unexpected that an exchange of potassium ions for sodium ions after the formation of Liesegang bands or layers would be possible because it was believed that the bands or layers would block or interfere with the ion-exchange. As seen from FIG. 5, there is a definite exchange of potassium ions for sodium ions near the surface of the glass after treatment in the subsequent ion-exchange molten metal salt bath. As such, FIG. 5 indicates that the polarizers of the present disclosure can be chemically strengthened.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for making a glass optical polarizer, the method comprising:
providing a fusion drawn alkali-containing glass substrate;
ion-exchanging a noble metal ion into the glass substrate using an ion-exchange molten metal salt bath comprising a noble metal salt and an alkali metal salt;
removing excess ion-exchange salts from the glass substrate;
reducing the noble metal ion in hydrogen to form a plurality of zero valent metallic particle polarizing layers;
redrawing the glass substrate to elongate said zero valent metallic particle polarizing layers, thereby forming elongated zero valent metallic particle polarizing layers;
wherein the glass optical polarizer comprises two pristine glass surfaces and is substantially bubble free.

2. The method of claim 1, wherein the glass substrate has a thickness of about 0.5 mm to about 2.0 mm.

3. The method of claim 1, wherein the glass substrate is selected from the group consisting of alkali-containing aluminosilicate glass and alkali-containing aluminoborosilicate glass.

4. The method of claim 1, wherein said reducing the noble metal ion step comprises reducing said metal ion in hydrogen at a pressure of about 1 atm to about 20 atm, at a temperature of about 350° C. to about 550° C., and for a period of about 1.0 hour to about 30 hours.

5. The method of claim 1, wherein the noble metal in said ion-exchanging step is selected from the group consisting of copper, gold, iridium, mercury, osmium, palladium, platinum, rhenium, rhodium, ruthenium, and silver.

6. The method of claim 1, wherein the glass substrate comprises about 60 mol % to about 70 mol % $SiO_2$, about 13 mol % to about 15 mol % $Na_2O$, about 7.0 mol % to about 15 mol % $Al_2O_3$, less than about 8.0 mol % $B_2O_3$, less than about 8.0 mol % MgO, less than about 2.0 mol % $K_2O$, less than about 1.0 mol % CaO and less than about 0.5 mol % $SnO_2$.

7. The method of claim 1, wherein said redrawing step comprises redrawing the glass substrate while the glass exhibits a glass viscosity in the range of about $10^5$ to about $10^{10}$ poise.

8. The method of claim 1, wherein said redrawing the glass substrate is done at a temperature greater than the anneal point of the glass, but at least about 50° C. less than the softening point of the glass.

9. The method of claim 8, wherein said redrawing the glass substrate is done at a temperature between about 750° C. to about 900° C.

10. The method of claim 1, further comprising, subsequent to said redrawing the glass substrate, ion-exchanging an alkali metal ion into the glass substrate using an ion-exchange molten metal salt bath comprising an alkali metal salt.

* * * * *